July 3, 1962     M. A. DU BOIS     3,042,351
CABLE TRAYS
Filed May 27, 1960     3 Sheets-Sheet 1
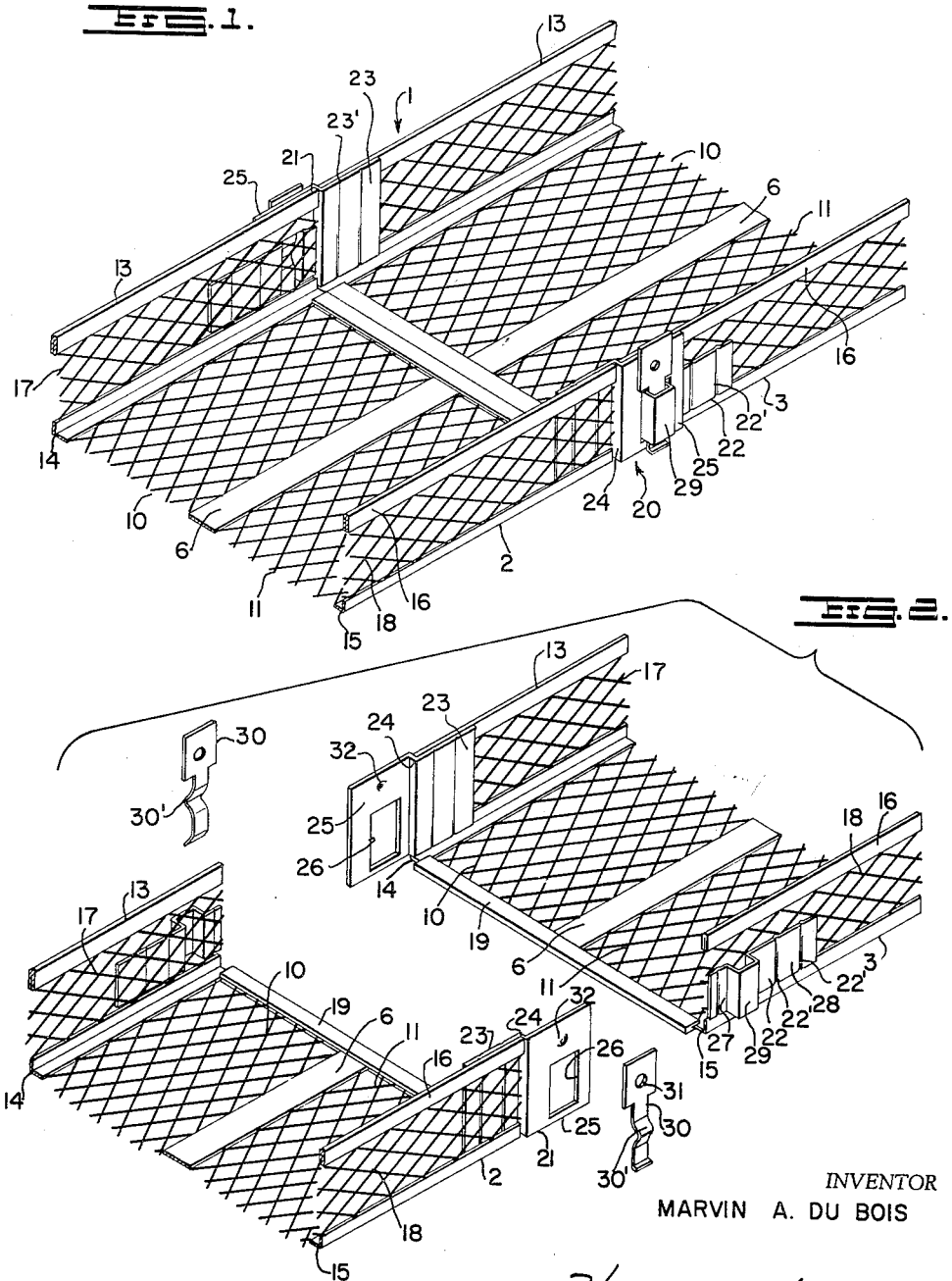
INVENTOR
MARVIN A. DU BOIS
BY *Harmon & Kurz*
ATTORNEY

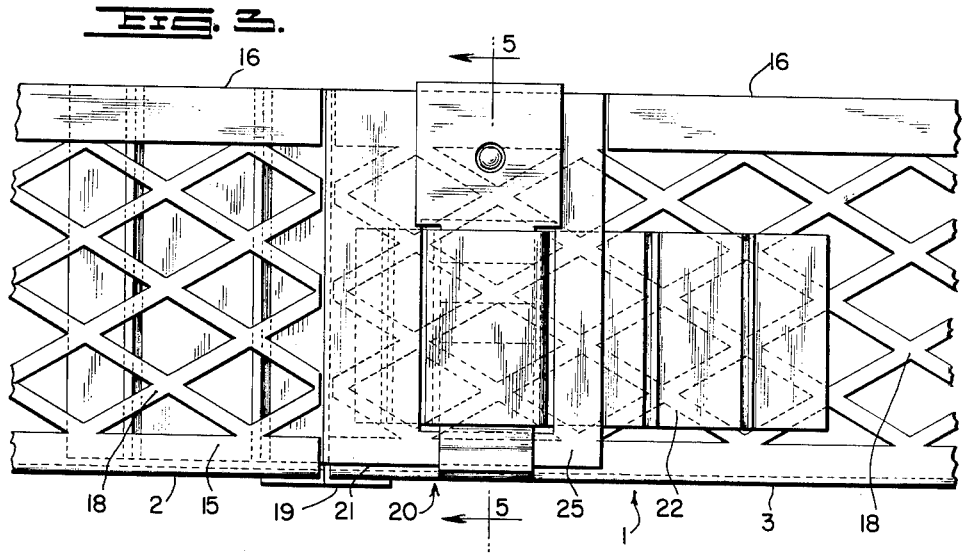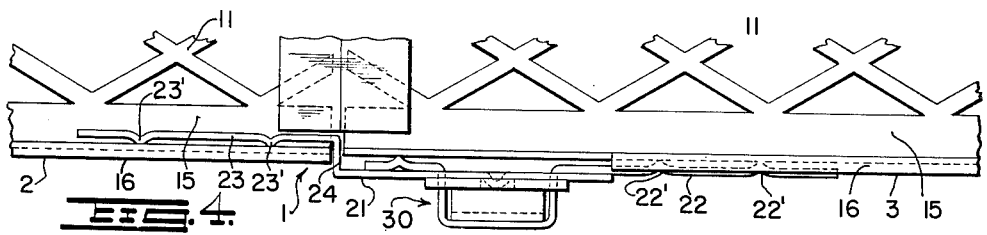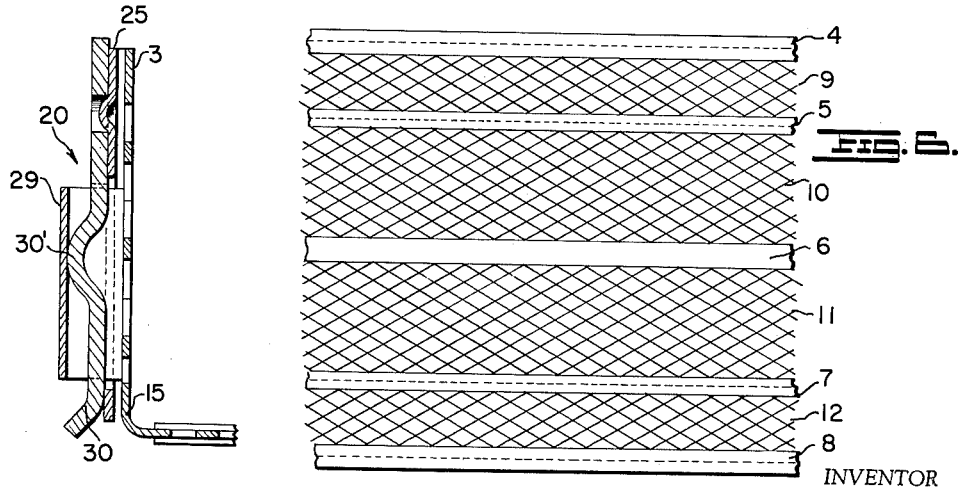

July 3, 1962
M. A. DU BOIS
3,042,351
CABLE TRAYS
Filed May 27, 1960
3 Sheets-Sheet 3
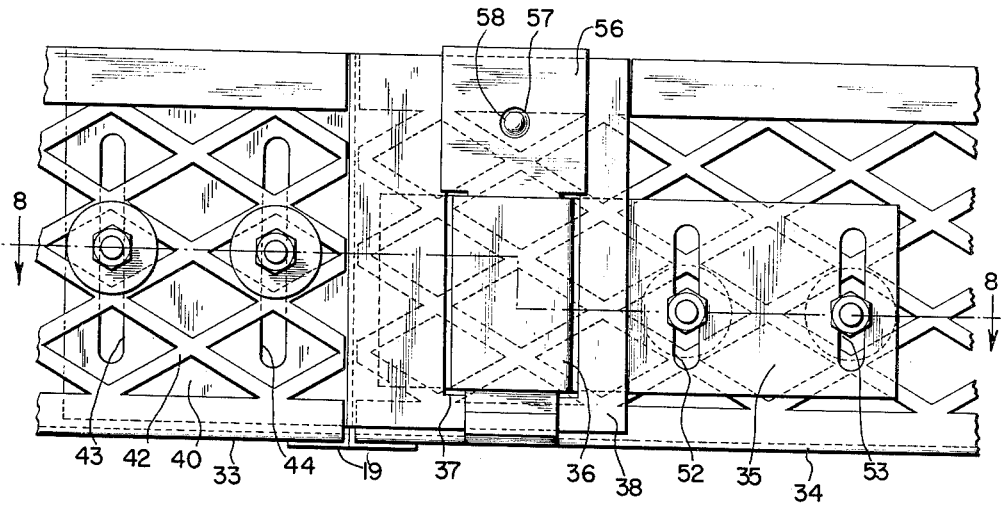
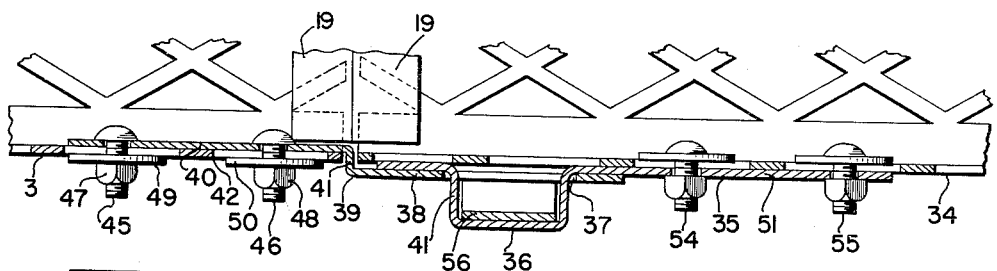
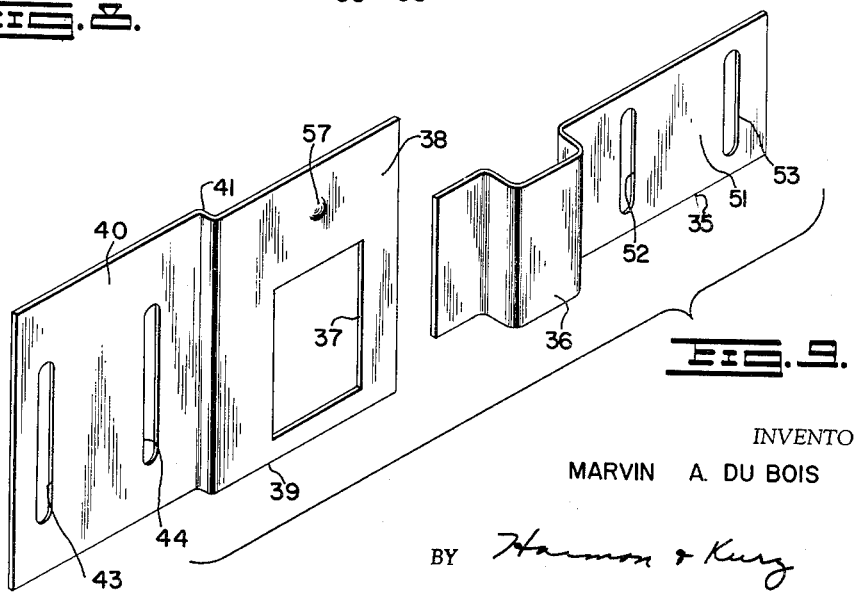
INVENTOR
MARVIN A. DU BOIS
BY *Harmon & Kurz*
ATTORNEY

United States Patent Office 3,042,351
Patented July 3, 1962

3,042,351
CABLE TRAYS
Marvin A. Du Bois, 2600 169th St., Hammond, Ind.
Filed May 27, 1960, Ser. No. 32,281
6 Claims. (Cl. 248—49)

This invention relates generally to cable supporting systems, and more specifically to the structure of cable trays for carrying electric power cables in suspended positions about an industrial installation.

The primary object of this invention is to provide an improved cable tray structure for supporting power cables in a suspended position.

A more specific object of this invention is to provide an improved cable support tray structure formed from expanded metal in such a manner as to provide a relatively lightweight but structurally sound cable support tray for power cables.

Another object of this invention is to provide an improved connecting structure whereby adjacent cable trays in the support system may be rigidly connected together at their abutting edges.

A still further object of this invention is to provide a connecting structure for the abutting edges of a pair of power cable support trays which is of rugged construction and yet will simplify installation and maintenance of the trays.

A further object of this invention is to provide an improved cable tray structure formed of expanded metal in such a manner that certain areas of the tray are expanded during manufacture to render the tray lighter in weight while other portions of the tray are maintained in non-expanded condition to provide rigidity for the finished tray structure.

With the foregoing and other objects in view, the invention resides in the following specification and appended claims, certain embodiments of which are illustrated in the accompanying drawings in which:

FIGURE 1 is a perspective view in fragmentary form of the preferred form of the invention illustrating a pair of abutting cable trays of a cable support system joined together by the improved connection structure of the invention;

FIGURE 2 is an exploded view of the structure of FIGURE 1;

FIGURE 3 is an enlarged fragmentary view in front elevation of the form of the invention of FIGURE 1 illustrating the connecting structure;

FIGURE 4 is a fragmentary plan view of the structure of FIGURE 3;

FIGURE 5 is a sectional view taken along the lines 5—5 of FIGURE 3;

FIGURE 6 is a plan view of the sheet metal material utilized for the trays of FIGURE 1 prior to the time that the material is formed into tray design with the bend lines for the trays indicated by the dotted lines;

FIGURE 7 is a view in front elevation similar to FIGURE 3 but illustrating a modified form of connecting structure between adjacent cable trays;

FIGURE 8 is a view taken along the lines 8—8 of FIGURE 7; and

FIGURE 9 is an exploded detail of the mating connecting parts for the cable trays of FIGURES 7 and 8.

Referring now more particularly to FIGURES 1-6 inclusive, a cable tray assembly generally indicated at 1 includes a pair of abutting trays 2 and 3. Each tray member 2 and 3 is formed from a planar sheet of suitable metal having certain areas thereof slotted and expanded as illustrated in FIGURE 6. In order to lend rigidity to the over-all tray structure, the sheet of metal illustrated in FIGURE 6 includes non-expanded areas 4, 5, 6, 7 and 8 and expanded areas 9, 10, 11 and 12. The expanded metal areas serve to provide for tray ventilation while lightening the over-all weight of the support tray itself. The non-expanded areas are utilized to provide structural support along the upper edges of the tray, the central portion of the lower or floor section of the tray, and the lower bent corner portions of the tray.

According to certain customer requirements the areas of expanded and non-expanded metal may be suitably varied. For example, the bottom wall section of each tray may include a plurality of strengthening areas 6 of non-expanded metal. Also, the side walls of the trays may be solid or non-expanded in form with the bottom walls being either of an entirely expanded metal form, entirely of non-expanded form or of a structural form between these two extremes. The form illustrated by FIGURE 6 indicates the preferable areas for the non-expanded metal and the possible weight reducing and ventilating areas of expanded metal. As illustrated in FIGURE 6 by the dotted lines, the material of FIGURE 6, after having been expanded in certain of the designated areas, is then formed by suitable machinery along the dotted lines of the sections 4, 5, 7 and 8 to result in tray sections 13, 14, 15 and 16. As is clearly illustrated in the drawings, the upper edge sections 13 and 16, formed from the sheet areas 4 and 8, comprise folded over, and inherently reinforced upper edges for the tray members 2 and 3. The lower corner sections 14 and 15 formed from the sheet areas 5 and 7 are bent along the dotted lines as illustrated into a right angle so as to provide a rigid connection between the side walls 17 and 18 and the bottom wall of the tray, such side walls 17 and 18 being derived from the expanded areas 9 and 12. Rigidity along the bottom wall of each tray is provided by the non-expanded strip area 6.

Secured along a longitudinal edge of the bottom wall section of each tray 2 and 3 is a substantially U-shaped edge member 19 which, in installation of the trays, will abut against each other to provide a continuous support path for cables strung along the tray system or supported thereby. The abutting edge pieces 19 may be secured to the expanded metal of the tray as by welding or any other suitable means. The edge pieces 19 also provide a means of rigidifying each tray transversely of the longitudinal axis of a tray.

A tray connecting assembly generally indicated at 20 includes a strap member 21 and a co-acting strap member 22. One leg of the strap 21 as indicated at 23 is secured as by projection welding or other suitable means along ridges 23' to the interior surface to each side wall 17 and 18 of a tray. The strap 21 is provided with a stepped area 24 directed transversely of the tray and outwardly thereof past the terminal edge of a side wall. Integral with the stepped portion 24 and extending axially of the tray is a second leg portion 25 having a substantially rectangular opening 26 provided therein. Connected with the side walls 17 and 18 of the abutting tray 3 is a pair of straps 22 of identical character only one of which will be described. The straps 22 connected to the tray 3 include two longitudinal sections 27 and 28 which are fixed as by projection welding or other suitable means at ridge points 22' to the side walls 17 and 18. Between the sections 27 and 28 there is provided a section 29 which acts as a tongue member and, during assembly of the trays 2 and 3, the section 29 will snap into position through an opening 26 of a strap 21. After the strap member 22 has been so engaged with the strap 21, a stiff retaining pin 30 is inserted into the portion of the tongue 29 projecting through the opening 26 to thereby retain the interconnected strap members in locked relationship. If desired, the retaining pins 30 may be provided with openings 31 to cooperate with similarly positioned detents 32 in the legs 25 so as to prevent any tendency of the pin 30 to move from its locking position. In order to assure structural rigidity and good electrical continuity in the connector assemblies 20, the pins 30 are provided with offset areas 30' which are large enough to spring bias the pins into a tight functional contact between the wall of the section 29 and the strap portion 25.

It will therefore be apparent to one skilled in the art that the structure of the trays 2 and 3, together with the rigid structure of the interconnecting assemblies between the trays, provides a simple and inexpensive means for producing and installing a plurality of cable tray members in a suspended tray system. The connecting assemblies 20 are such as to provide for non-shifting firm abutting engagement by the members 19 and the adjoining side wall portions of the trays such that the over-all system or assembly of trays 1 will in effect be substantially one continuous member instead of a plurality of separate tray members typified by trays 2 and 3. It will also be obvious to one skilled in the art, that the tray and connection structures are most admirably suited to remote fabrication for installation at an industrial site without the necessity of trained personnel or special tools. It is only necessary that certain dimensions be known for a particular application of the cable tray system and then the sheet material illustrated in FIGURE 6 may be so slotted, fabricated and expanded as to be fully within the specification of a particular application. Likewise the connection members are of simple stamped sheet metal material which are firmly applied as by welding at the remote site so that on installation the only thing that a mechanic has to contend with is the insertion of the retaining pins 30. In other words the connection assembly 20 in effect cooperates with the individual rigidified formation of each tray 2 and 3 in such a manner as to provide a simplified, relatively lightweight, ventilated, rigid cable tray support system which represents a considerable improvement over the prior art in this field.

Referring now to the modified form of connector assembly illustrated in FIGURES 7, 8 and 9, there is illustrated a pair of joined cable trays 33 and 34. The trays 33 and 34 are of identical character to the trays 2 and 3, respectively, of FIGURES 1-6. Connected to the tray 34 is a strap member 35 which includes an outwardly directed tongue section 36 which is adapted to pass, in close fitting arrangement, through a mating opening 37 in one leg 38 of a connecting strap 39. The other leg 40 of strap 39 is offset inwardly as is clearly illustrated in FIGURE 8 by a stepped section 41 whereby the leg 40 is positioned along the inner face of the side wall 42 of the tray 33. The leg 40 of strap 39 is provided with a pair of vertical slots 43 and 44 whereby to provide for adjustable mounting of the strap relative to the expanded frame side wall 42. Bolts 45 and 46 extend through the slots 43 and 44 and are capped by nuts 47 and 48 along with washers 49 and 50 whereby upon proper alignment of the leg 40 of strap 39 along the wall 42, a tightening of the bolts 45 and 46 will result in a firm rigid mounting of the strap 39 relative to the side wall 42. A similar mounting arrangement for the strap 35 is provided with a pair of spaced vertical slots 52 and 53 through which bolt and nut assemblies 54 and 55 may be applied to firmly clamp and align strap member 35. Upon inter-engagement of the tongue member 36 with the opening 37 of the strap 39 the portion of the tongue projecting through the opening is adapted to receive a locking pin 56 in a manner similar to the arrangement of the locking pin 30 of the preferred form of the invention. As illustrated the leg 38 of the strap 39 is provided with a dimpled portion 57 which is adapted to mate with a similar detent or opening 58 in the pin 56 to releasably lock the pin in the assembled position.

It is realized that the forms of the invention described and shown herein may be subject to numerous detail modifications which should be considered well within the scope and concepts of this invention and the appended claims.

I claim:
1. A cable tray for supporting electric power cables, said tray comprising a single unitary piece of sheet metal material formed into a substantially U-shaped tray having side walls and a bottom wall connecting said side walls, each said side wall terminating in an upper edge formed of non-expanded metal and each lower corner portion of said side walls at the juncture with said bottom wall being formed from non-expanded metal, said bottom wall being further provided with at least one generally centrally located and longitudinally extending section of non-expanded metal with the remainder of said tray between the sections of non-expanded metal being formed of expanded metal, and individual continuous U-shaped edging members rigidly affixed to each end of said bottom wall and extending between the lower corner portions of the side walls.

2. A cable tray assembly comprising a pair of cable trays, each of said trays comprising a single unitary sheet of metal formed into a tray of a substantially U-shaped cross section, and each of said trays being formed of integral sections of expanded and non-expanded metal for the purpose of rigidity and ventilation, a strap member connected to each vertical adjoining edge of each of said cable trays, the strap member connected to one of the vertical edges of one of said trays including a portion extending beyond the edge thereof and including an opening therethrough, and the strap member connected to the adjoining edge of the other of said trays being provided with a laterally extending tongue to cooperate with and extend through said opening to rigidify and interconnect the cable trays in abutting edge relationship, and a removable locking pin having an offset portion engaged with said tongue to releasably retain the interengagement between the straps of the abutting tray members.

3. A connector assembly for abutting cable trays comprising: a pair of strap members, said strap members being in overlapping relation when engaged, a first one of said strap members including an opening of a predetermined angular contour, the second of said strap members including a laterally extending hollow tongue of substantially mating configuration to the opening in the first strap member and extending therethrough, a locking pin, said locking pin including a flat portion bearing against the overlapped portion of said first strap and an offset spring portion extending through the hollow portion of said tongue and baring thereagainst, and detent means provided between the flat portion of said locking pin and the overlapped portion of said first strap member for holding said locking pin in place.

4. In a cable tray assembly, a connector assembly for connecting a pair of adjacent cable trays in rigid relationship comprising; a first pair of identical strap members rigidly connected with one of said trays, each of said first pair of strap members including a portion extending beyond the edge of said one tray and including an opening of a predetermined angular contour, a second pair of strap members connected with the other of said trays and terminating short of the edges of said other tray, each of said second straps including an outwardly extending hollow tongue of substantially identical configuration to the openings in the first pair of straps, the strap members of said first and second pairs of strap members being in overlapping relation with the tongues of said second pair extending through the openings of said first pair, a locking pin located within each of said hollow tongues, each locking pin including a flat portion bearing against the extended portion of the associated first strap member and an offset spring portion extending through the associated hollow tongue and bearing thereagainst, and detent means between the flat portions of said pins and the extended portions of the first straps for holding said locking pins in place.

5. In a cable tray assembly, a connector assembly for rigidly connecting adjacent abutting edges of individual trays comprising; a first strap connected to one of said trays and terminating short of the edge thereof, said first strap including a laterally offset portion forming a hollow tongue, a second strap connected to the other of said trays and having a portion thereof extending beyond the edge of said tray and overlapping said first strap, said second strap being provided with an angularly contoured opening through which said hollow tongue extends in tight fitting relation, a locking pin, said locking pin including a flat portion bearing against the extended portion of said second strap and an offset spring portion extending through the hollow portion of said tongue and bearing thereagainst, whereby a constant spring bias is maintained between the interfitting parts of said first and second straps.

6. The combination according to claim 5 wherein detent means is provided between the flat portion of said locking pin and the extended portion of said second strap for holding said locking pin in place.

References Cited in the file of this patent

UNITED STATES PATENTS

| | | |
|---|---|---|
| 454,104 | Wyatt | June 16, 1891 |
| 686,452 | Haywood | Nov. 12, 1901 |
| 2,366,224 | Warp | Jan. 2, 1945 |
| 2,620,248 | Mutchnik | Dec. 2, 1952 |
| 2,823,056 | Di Meo | Feb. 11, 1958 |

FOREIGN PATENTS

| | | |
|---|---|---|
| 672,476 | Germany | Mar. 6, 1939 |